Patented Apr. 18, 1950

2,504,130

UNITED STATES PATENT OFFICE 2,504,130

PROCESS OF MAKING ALKALINE EARTH METAL PERMANGANATES

Theodore Jaskowiak, La Salle, Ill., assignor to Carus Chemical Company, a corporation of Illinois No Drawing. Application October 12, 1945, Serial No. 622,086

8 Claims. (Cl. 23—58)

This invention relates to a method of forming alkaline earth permanganates from aluminum permanganate and more particularly to the formation of such alkaline earth permanganates in a series of reactions starting with potassium permanganate, and passing through aluminum permanganate.

The production of these permanganates, in pure form, has heretofore been a matter of extreme difficulty and expense. The prior art is summarized in Wilson et al. Patent 1,544,115. In addition to the methods there suggested for the production of calcium permanganate, a disinfecting solution including aluminum permanganate is described in British Patent 10,015 of 1884, this solution being prepared by the interaction of aluminum sulfate and potassium permanganate, the resulting mixture being said to comprise aluminum permanganate and aluminum sulfate. No attempt was made to obtain an aluminum permanganate of greater purity or concentration.

I have now discovered that by proper control of reacting ingredients and reaction temperatures, potassium permanganate and aluminum sulfate, and a limited amount of water will react according to the following equation:

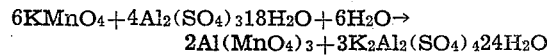

to produce a solution substantially pure and suitable for use in producing the aforementioned permanganates, while nearly all potassium will be removed as crystallized potassium aluminum sulfate. It is to be understood that only sufficient water is added to produce a concentrated solution of aluminum permanganate. Preferably this involves the addition of ingredients in the following proportions:

| | Pounds |
|---|---|
| Potassium permanganate | 172 |
| Aluminum sulfate 18H$_2$O | 500 |
| Water | 500 |

In this reaction a small excess of aluminum sulfate may be used, depressing further the solubility of potassium salts and not interfering greatly with further use of the resulting solution.

Aluminum permanganate is unstable, especially at higher temperatures and the reaction mixture should preferably be maintained at all times below 80° C. Upon cooling to effect crystallization, the mass is filtered or the potassium aluminum sulfate is removed in any other suitable manner. The resulting aluminum permanganate solution is then employed to produce the desired permanganate such as, for example calcium, barium or strontium, by reaction with the corresponding oxide, hydroxide or carbonate. The required oxide, hydroxide, or carbonate or any admixture and/or sequence thereof, is added in water solution or in any form in suitable proportions to the aluminum permanganate solution, or the aluminum permanganate solution may be added to the oxide etc., or the two may be added to one or the other concurrently. In the case of the more stable permanganates, as, for example, calcium, barium and strontium this reaction is preferably carried out at or near the boiling temperature. In general care should be taken to use only such amounts of oxide, etc., as to react completely, without adding an excess, with the aluminum permanganate solution in accordance with the equation:

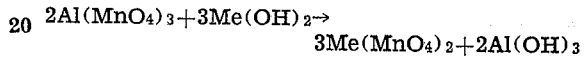

Upon completion of this reaction, the permanganate solution is separated from the precipitated solids as by filtration. The resulting solution is one of substantially the pure permanganate desired, together with small amounts of sulfate and potassium ions. This solution may be used as such or it may further be processed to yield a solution of higher concentration and greater purity or it may be processed to yield a solid crystalline product.

To obtain a solution of greater concentration and higher purity the permanganate solution is concentrated by evaporation either at atmospheric pressure or under reduced pressure, when sulfates will crystallize out progressively as the concentration rises, these sulfates usually being the lower hydrates. As the concentration increases some potassium permanganate also crystallizes out, especially upon cooling the concentrated solution.

The maximum concentration obtainable varies with the different permanganates, depending upon their solubilities. For example, calcium permanganate may be concentrated to a content of 75% to 80% Ca(MnO$_4$)$_2$4H$_2$O and a specific gravity of 1.700 to 1.750 at room temperatures.

Some permanganates such as calcium being very soluble prove to be extremely difficult to crystallize in stable form; the crystals obtained being in the hydrated form, often dissolve in their contained water of crystallization when subjected to temperatures but little higher than the usual room or atmospheric temperatures. To produce a stable permanganate such as these, in dry form, the concentrated filtered or clarified solution of such a permanganate is further evaporated at temperatures preferably below 100° C. until the water content is reduced to an amount corresponding to 4 moles of water for calcium permanganate, at which point the solution or melt is allowed to solidify into a solid crystalline mass by suitable means such as sheeting, flaking, etc.

Permanganates such as barium and strontium, though having a rather high solubility in water, will, after concentration, yield well definable crystals which can be separated and kept as such.

The invention described and claimed herein is related to those described and claimed in my copending applications, Serial Nos. 622,085 and 622,087, filed October 12, 1945.

The foregoing detailed description has been given for clearness of understanding only, and no unnecessary limitations should be understood therefrom.

What I claim as new, and desire to secure by Letters Patent, is:

1. The method of forming an alkaline earth metal permanganate, which comprises reacting a solution of aluminum permanganate with a member of the class consisting of an oxide, hydroxide and carbonate of an alkaline earth metal at a temperature above 80° C. to and including the boiling point of the solution, and recovering the alkaline earth metal permanganate.

2. The method as set forth in claim 1 in which the metal is calcium.

3. The method as set forth in claim 1 in which the metal is barium.

4. The method as set forth in claim 1 in which the metal is strontium.

5. The method of forming an alkaline earth permanganate which comprises reacting potassium permanganate and aluminum sulfate in the presence of sufficient water to produce a concentrated solution of aluminum permanganate, said reaction being conducted at a temperature not substantially above 80° C., separating out substantially all potassium aluminum sulfate, then reacting with the aluminum permanganate solution a member of the class consisting of an oxide, hydroxide and carbonate of an alkaline earth metal at a temperature above 80° C. to and including the boiling point of the solution, and recovering the alkaline earth permanganate.

6. The method as set forth in claim 5 in which the metal is calcium.

7. The method as set forth in claim 5 in which the metal is barium.

8. The method as set forth in claim 5 in which the metal is strontium.

THEODORE JASKOWIAK.

REFERENCES CITED

The following references are of record in the file of this patent:

FOREIGN PATENTS

| Number | Country | Date |
|---|---|---|
| 10,015 | Great Britain | 1884 |